(No Model.)  3 Sheets—Sheet 1.

S. T. OWENS.
METALLURGICAL FURNACE.

No. 321,311.  Patented June 30, 1885.

Witnesses  Inventor
Samuel T. Owens
by his attys
Bakewell & Kerr (No Model.) 3 Sheets—Sheet 2.

S. T. OWENS.
METALLURGICAL FURNACE.

No. 321,311. Patented June 30, 1885.

(No Model.) 3 Sheets—Sheet 3.

S. T. OWENS.
METALLURGICAL FURNACE.

No. 321,311. Patented June 30, 1885.

Witnesses
Inventor
Samuel T. Owens
by his attys.
Bakewell & Kerr

UNITED STATES PATENT OFFICE.

SAMUEL T. OWENS, OF PITTSBURG, PENNSYLVANIA.

METALLURGICAL FURNACE.

SPECIFICATION forming part of Letters Patent No. 321,311, dated June 30, 1885.

Application filed June 19, 1884. (No model.)

*To all whom it may concern:*

Be it known that I, SAMUEL T. OWENS, of Pittsburg, in the county of Allegheny and State of Pennsylvania, have invented a new and useful Improvement in Metallurgical Furnaces; and I do hereby declare the following to be a full, clear, and exact description thereof, reference being had to the accompanying drawings, forming part of this specification, in which—

Figure 1:
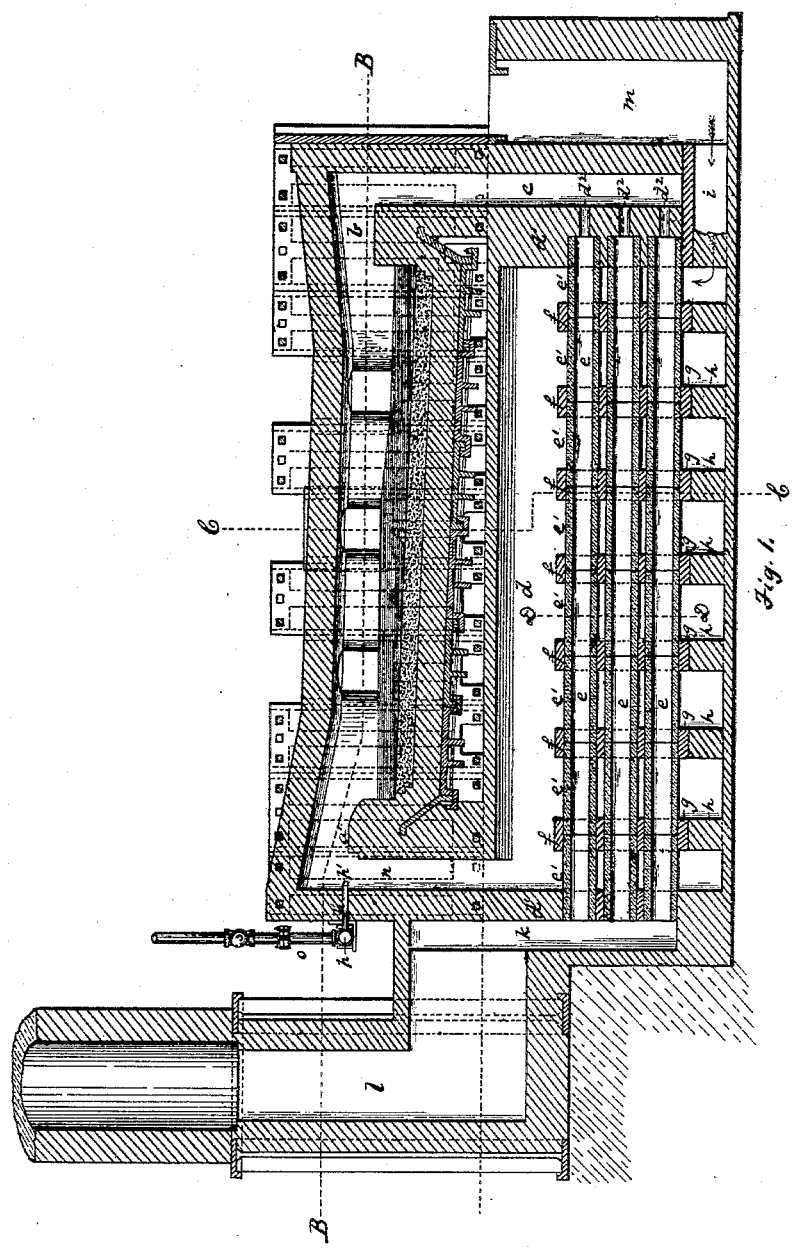
Figure 2:
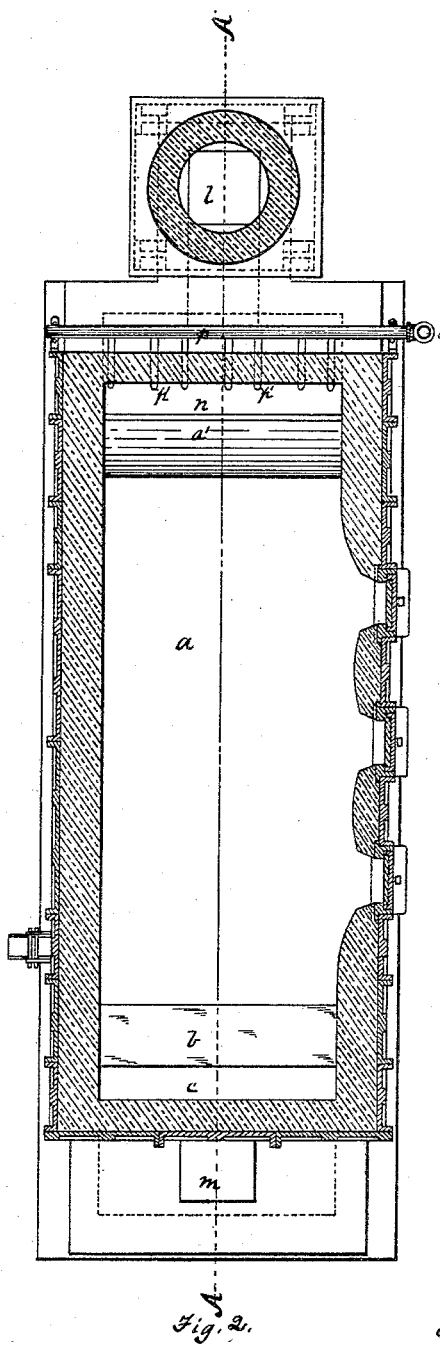
Figure 3:
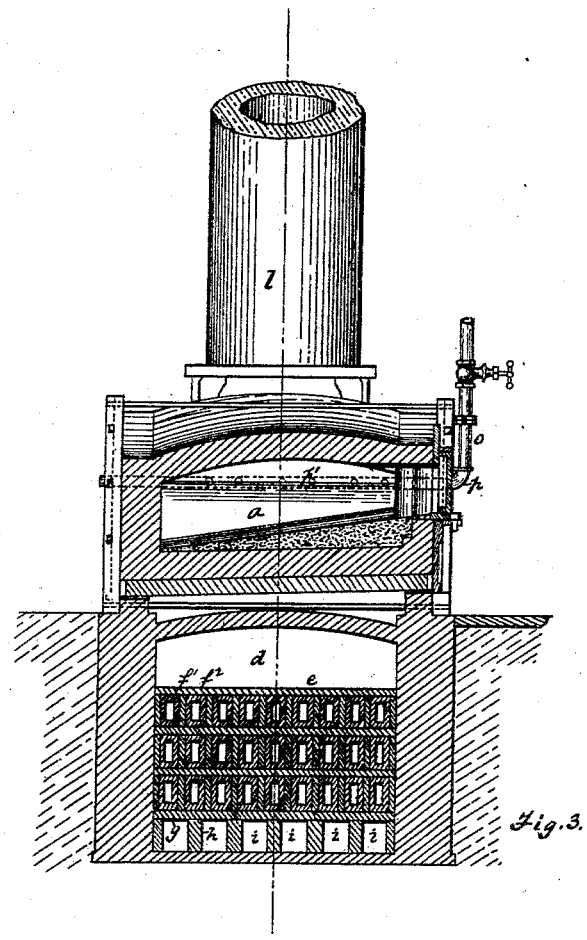
Figure 4:
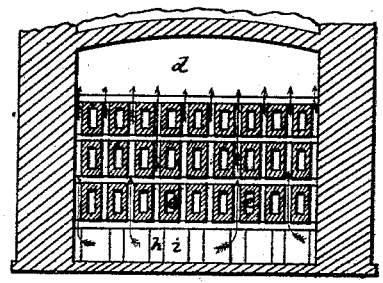

Figure 1 is a vertical longitudinal section of my improved furnace on the line A A of Fig. 2. Fig. 2 is a horizontal section on the line B B, Fig. 1. Fig. 3 is a vertical cross-section on the line C C, Fig. 1. Fig. 4 is a section of the air-heating flues between the supporting piers on the line D D, Fig. 1.

Like letters of reference indicate like parts in each.

My improved furnace is specially designed for the utilization of natural gas, but may be operated by the use of manufactured gas, if desired. It is also intended to obviate the necessity for the construction of the checker-work of regenerators, and to obtain the benefit of the use of the waste products of combustion for heating the air supplied to it for combustion of the gas, by means of a construction which will obviate the enormous expense attendant upon the construction of checker-work regenerators.

To enable others skilled in the art to make and use my invention, I will now describe it by reference to the drawings.

The bed $a$ is of the usual construction and is provided with a neck-flue, $b$, through which the waste products of combustion pass therefrom. The flue $b$ is connected with a descending flue, $c$, which leads downward to a point some distance below the bottom of the bed. Under the bed is a chamber, $d$, in which are arranged a series of longitudinal flues, $e$, composed of sections $e'$ of pipes made of fire-clay or other suitable refractory material, and above the flues $e$ is a clear space or dome-chamber, $d$, into which the heated air rises after passing between the pipes and before being led into the vertical flue $n$. These flues are supported by the end walls, $d'$, at the ends and by intermediate brick piers, $f$, at the joints. The piers are supported upon broad thick tiles, $g$, which in turn are sustained by piers $h$, which constitute the division-walls of air-flues $i$, extending under the chamber $d$. I have shown in the drawings three rows of flues $e$, each row filling the chamber $d$ entirely across its breadth. The piers $f$ are composed of horizontal courses $f'$ between each horizontal row of the flues $e$, and vertical courses $f^2$ between each vertical row of flues. Between the piers the space occupied by the courses $f'$ and $f^2$ is open, as shown in Fig. 4, so that the air from the flues $i$ is permitted to ascend between the pipes, as shown by the arrows in Fig. 4. The outlet-passage $c$ communicates with the flues $e$ by openings $d^2$, through the intermediate wall, $d'$, and at the other end the flues $e$ open directly into the stack-flue $k$, which leads up to the stack $l$. The course of the products of combustion is from the bed, through the flue $b$, down the passage $c$, openings $d^2$, flues $e$, stack-flue $k$, and stack $l$. At the front end of the furnace is an air-supply opening or chamber, $m$, communicating directly with the horizontal-air-flues $i$.

The air enters the air-flues $i$ from the chamber $m$ and passes directly under the flues $e$, between which it ascends, as shown by the arrows in Fig. 4, into the dome of the chamber $d$, whence it passes, by a vertical flue, $n$, upward to the bridge-wall $a'$ and then over the bridge-wall into the bed. The gas is supplied from a supply-pipe, $o$, to a distributing main, $p$, from which it passes to the furnace by nozzles $p'$, extending through the wall $d'$, and is delivered at the upper end of the flue $n$, on or nearly on a level with the top of the bridge-wall $a'$. The waste heat passing from the bed of the furnace, as described, through the refractory flues $e$, heats the latter up to a very high temperature, and the air passing from the air-flues $i$, up between the flues $e$, takes up the heat from the latter and is delivered into the furnace in a highly-heated condition.

The construction of the flues $e$ of refractory material enables them not only to become reservoirs of the best possible description for storing the waste heat, but to resist the intense temperature to which they are exposed without rapid destruction, while their formation in sections, the ends of which are supported by the piers $f$, provides for such expansion and contraction as they are subjected to, so that they are not liable to become distorted or displaced thereby.

The chamber $d$ is easily accessible for the purpose of removing or replacing injured sections of pipe.

The expense of the construction of this furnace, as compared with the ordinary Siemens regenerative furnace, is small, while, on the other hand, it gives practically the same result. It is particularly fitted for use with natural gas, as it gives the very high temperature required for the perfect combustion of the same. In the use of natural gas it is necessary to supply a very large volume of highly-heated air and a comparatively small volume of gas, the latter being discharged into the furnace at or near the point of combustion in a practically cold state. My improvement enables me to adapt it to existing furnaces with but little additional expense, and thereby avoids the necessity for the construction of the enormously expensive Siemens regenerative furnaces heretofore found to be necessary for the perfect combustion of the gas.

I am aware that Siemens furnaces have been constructed with regenerators, in which the air was caused to pass through a chamber heated by the waste gases by means of clay pipes arranged in a serpentine form and supported at the joints by brick piers, and I do not desire to claim such construction.

I am aware that it is not new, in hot-air blast-furnaces, to have air-heating pipes made of fire-clay, supported by the side walls of the heating-chamber, each of said pipes being composed of one piece and extending entirely across the said chamber and through the walls of the same. I make no claim to such construction; but What I do claim as my invention, and desire to secure by Letters Patent, is—

The combination, in a metallurgical furnace, of a chamber arranged under the bed provided with a series of flues for conveying away the waste products of combustion, composed of sections of clay pipes supported at the joints by suitable piers, air-inlet passages entering said chamber below the level of the waste-flues, a dome-chamber arranged above the waste-flues, a flue leading from said chamber to the bridge-wall of the furnace, and a gas-supply pipe or pipes discharging at or near the bridge-wall, substantially as and for the purposes described.

In testimony whereof I have hereunto set my hand this 6th day of June, A. D. 1884.

SAMUEL T. OWENS.

Witnesses:
THOMAS B. KERR,
W. B. CORWIN.